(12) United States Patent
Middelberg (10) Patent No.: US 10,150,340 B2
(45) Date of Patent: Dec. 11, 2018

(54) TEMPERATURE COMPENSATED SELF-INFLATING TIRE SYSTEM

(71) Applicant: THE GOODYEAR TIRE & RUBBER COMPANY, Akron, OH (US)

(72) Inventor: Jason Mark Middelberg, Napier (NZ)

(73) Assignee: The Goodyear Tire & Rubber Company, Akron, OH (US)

( * ) Notice: Subject to any disclaimer, the term of this patent is extended or adjusted under 35 U.S.C. 154(b) by 523 days.

(21) Appl. No.: 14/791,893

(22) Filed: Jul. 6, 2015

(65) Prior Publication Data
US 2016/0059645 A1    Mar. 3, 2016

Related U.S. Application Data

(60) Provisional application No. 62/042,841, filed on Aug. 28, 2014.

(51) Int. Cl.
| | | |
|---|---|---|
| *B60C 23/10* | (2006.01) | |
| *B60C 23/12* | (2006.01) | |
| *B60C 29/00* | (2006.01) | |
| *B60C 29/04* | (2006.01) | |
| *F16K 15/20* | (2006.01) | |

(52) U.S. Cl.
CPC ............ *B60C 29/002* (2013.01); *B60C 23/12* (2013.01); *F16K 15/20* (2013.01)

(58) Field of Classification Search
CPC ......... B60C 23/10; B60C 23/14; B60C 29/00; B60C 29/04; B60C 29/06; B60C 29/066
See application file for complete search history.

(56) References Cited

U.S. PATENT DOCUMENTS

2013/0048178 A1    2/2013    Hinque

OTHER PUBLICATIONS

Thermo Variable rate springs : A new concept for Thermal Sensor-Actuators, Waram Stoeckel, Springs—The magazine of Spring Technology, vol. 30, Nr. 2, pp. 35-42, 1991.

*Primary Examiner* — Justin R Fischer
(74) *Attorney, Agent, or Firm* — June E. Rickey (57) ABSTRACT

A self-inflating tire assembly includes an adjustable valve having: a housing having first end and a second end, and a central bore which extends from the first end to the second end; a piston slidably mounted within the central bore at the first end of the housing, a cap mounted in the second end of the housing forming a chamber with the housing, wherein a spring is mounted within the chamber and having a first end for engagement with the piston and a second end for engagement with a bottom wall of the chamber, said cap further comprising a fluid chamber projecting from the bottom wall of the chamber, wherein the piston is movable to seal the fluid chamber, wherein the housing is made from a material having a higher coefficient of thermal expansion than the material of the fluid chamber.

5 Claims, 7 Drawing Sheets

TEMPERATURE COMPENSATED SELF-INFLATING TIRE SYSTEM

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

Self-inflating tire systems regulates the tire pressure. One problem is that the pressure of a tire changes with temperature. This may be due to the temperature increase due to the rise in ambient temperature, the operation of the tire, hysteresis losses, and as a result in the increase in vehicle speed. Generally, self-inflating tire systems allow inflation of a tire when the tire cavity pressure falls below a selected value. This selected value may not account for the increase in temperature. If the temperature rise is significant from an increase due to ambient temperature or vehicle speed, the system may not inflate the tire resulting in an underinflated tire. Thus it is desired to provide a temperature compensated pressure regulation system for air maintenance tires.

BRIEF DESCRIPTION OF THE DRAWINGS

The invention will be described by way of example and with reference to the accompanying drawings in which.

DETAILED DESCRIPTION OF THE INVENTION

Figure 1:
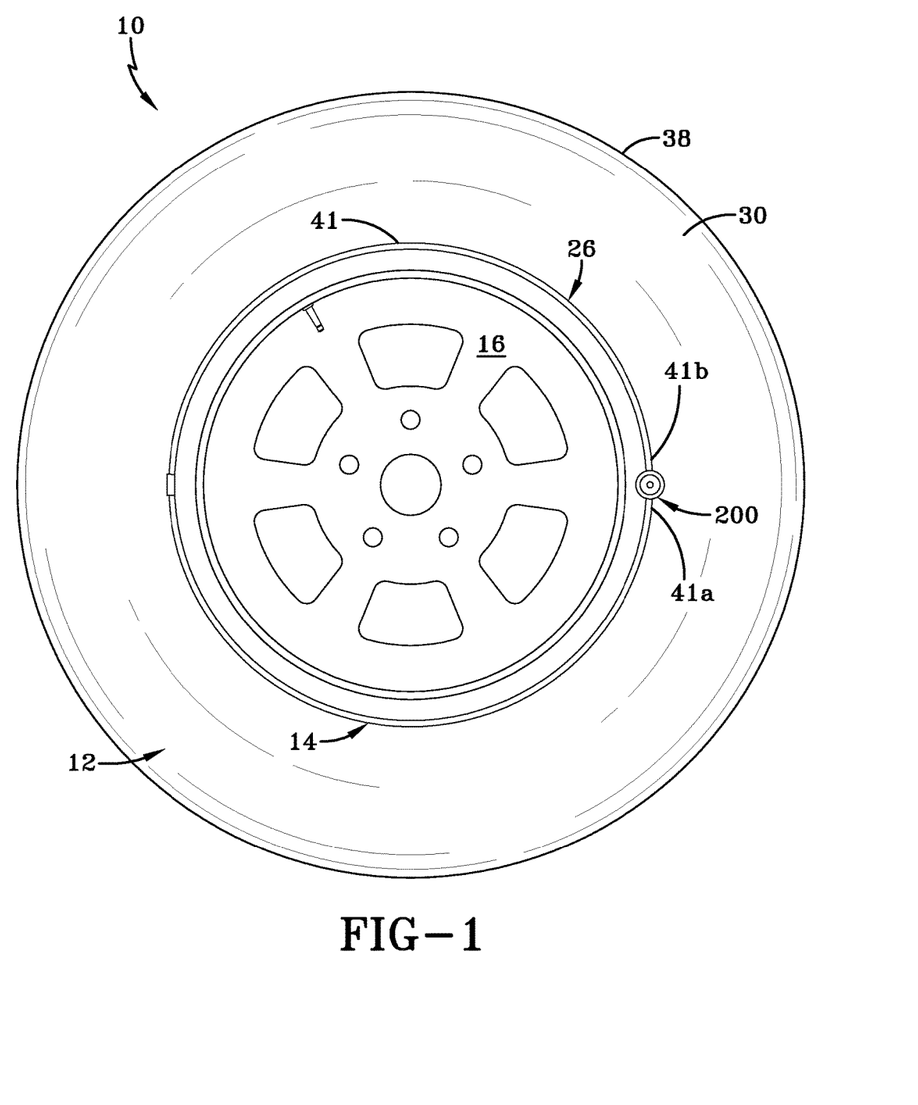
FIG. 1 is a front view of tire and rim assembly showing two peristaltic pump assemblies.
Figure 4:
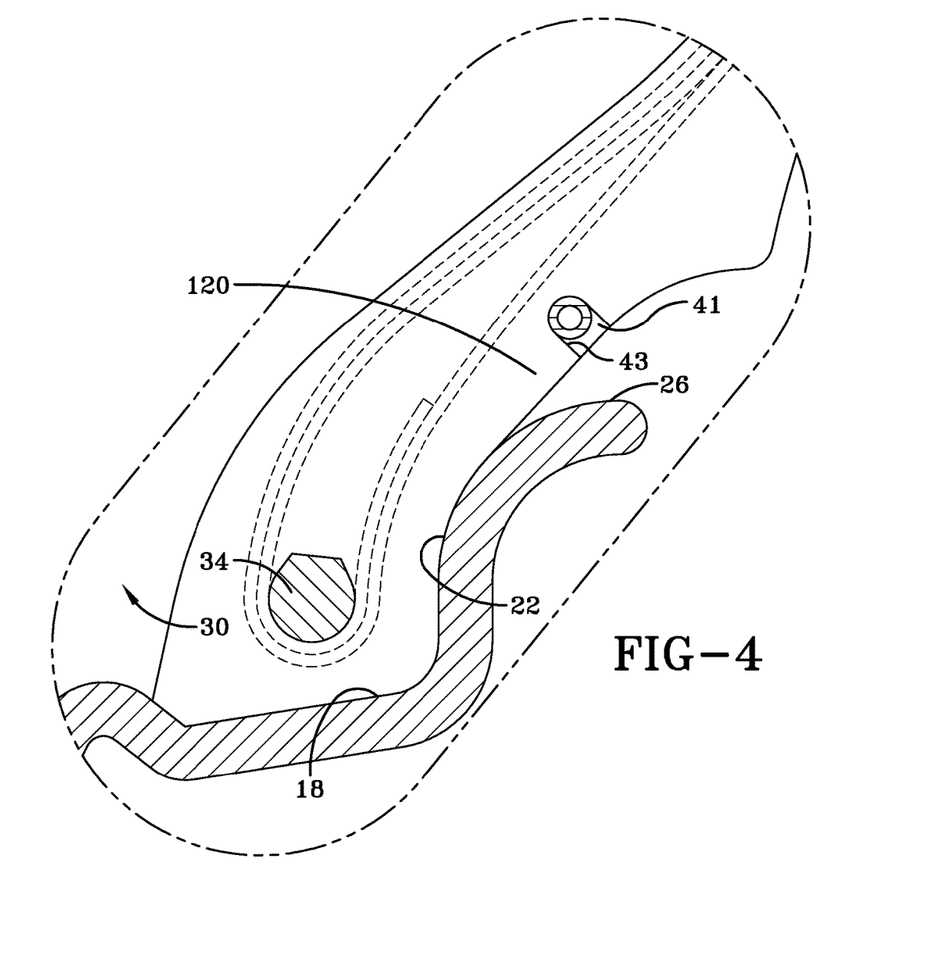
FIG. 4 is a partial section view through the tire in the bead area showing the pump tube location next to the rim.

Referring to FIGS. 1 and 4, a tire assembly 10 includes a tire 12, a peristaltic pump assembly 14, and a tire rim 16. The tire mounts in a conventional fashion to a pair of rim mounting surfaces 18 located adjacent outer rim flanges 22. The outer rim flanges 22 have an outer rim surface 26. The tire is of conventional construction, having a pair of sidewalls 30 extending from opposite bead areas 34 to a crown or tire tread region 38. The tire and rim enclose a tire cavity 40.

Figure 2:
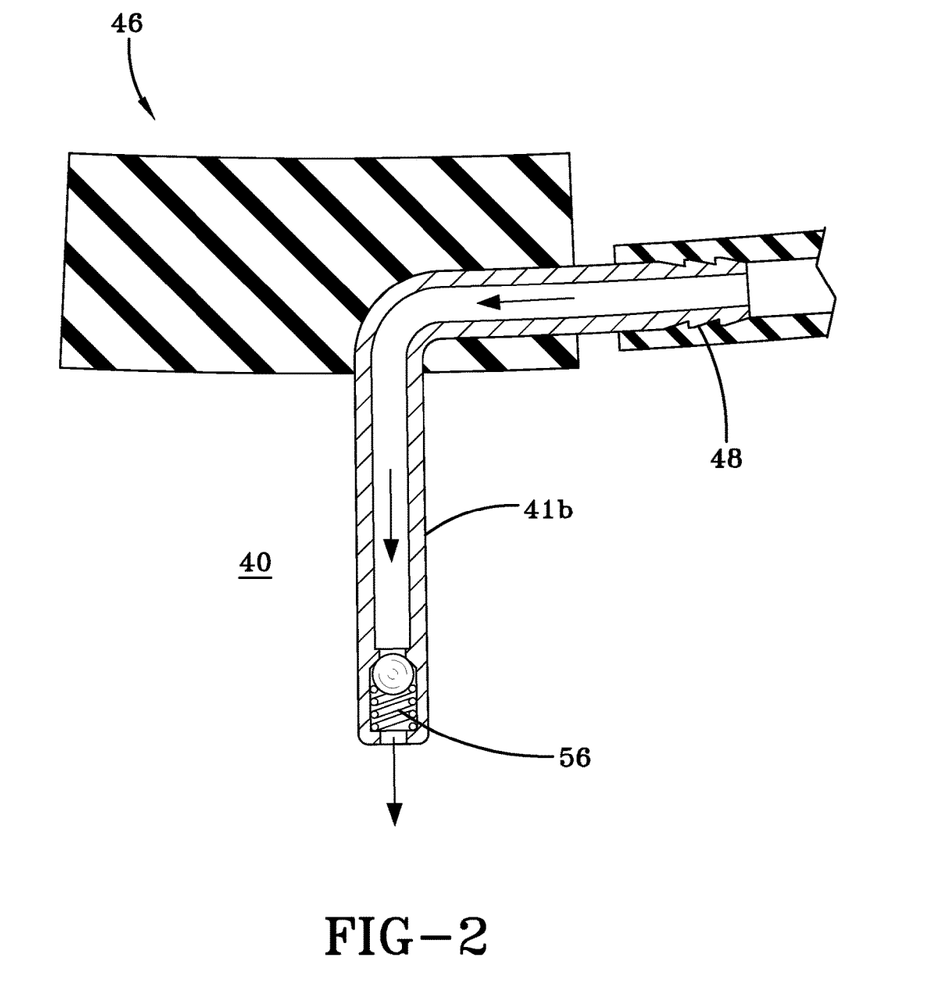
FIG. 2 is a cross-sectional view of the pump outlet mechanism.

As shown in FIG. 4, the peristaltic pump assembly 14 includes a pump 41 that is mounted in a passageway 43 located in the sidewall area of the tire, preferably near the bead region. The air passageway is preferably molded into the sidewall of the tire during vulcanization and is preferably annular in shape. The pump 41 has a first end 41a in fluid communication with an outlet passageway of a regulator device 100. The pump has a second end 42b in fluid communication with the tire cavity 30 as shown in FIG. 2. FIG. 2 further illustrates that each outlet end 41b may further comprise a check valve 56 to prevent backflow of air into the pump.

The pump 41 is comprised of a tube formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized. The tube may also be integrally formed in the tire sidewall.

A first embodiment of a valve device 200 is shown in FIGS. 5-9. The valve device functions to regulate the flow of air into a pump 41. The valve device has a housing 202 having a first end 204 and a second end 206. The housing has an inlet passageway 207 that is in fluid communication with ambient air and a central bore 208. The central bore 208 extends from the first end 204 of the housing to a valve seat 210 formed in the interior of the housing. The valve seat extends from the sidewall of the central bore 208, and is located near the second end 206. The valve seat may be made as a discrete component that is affixed to the sidewall of the central bore 208. A flexible annular diaphragm 220 having a central hole 222 is located in the second end 206 and positioned on the valve seat 210. A cap 205 is positioned in the second end 206 of the housing 202. The cap has a hole 207 for communicating fluid from the valve device to the tire cavity.

Figure 5:
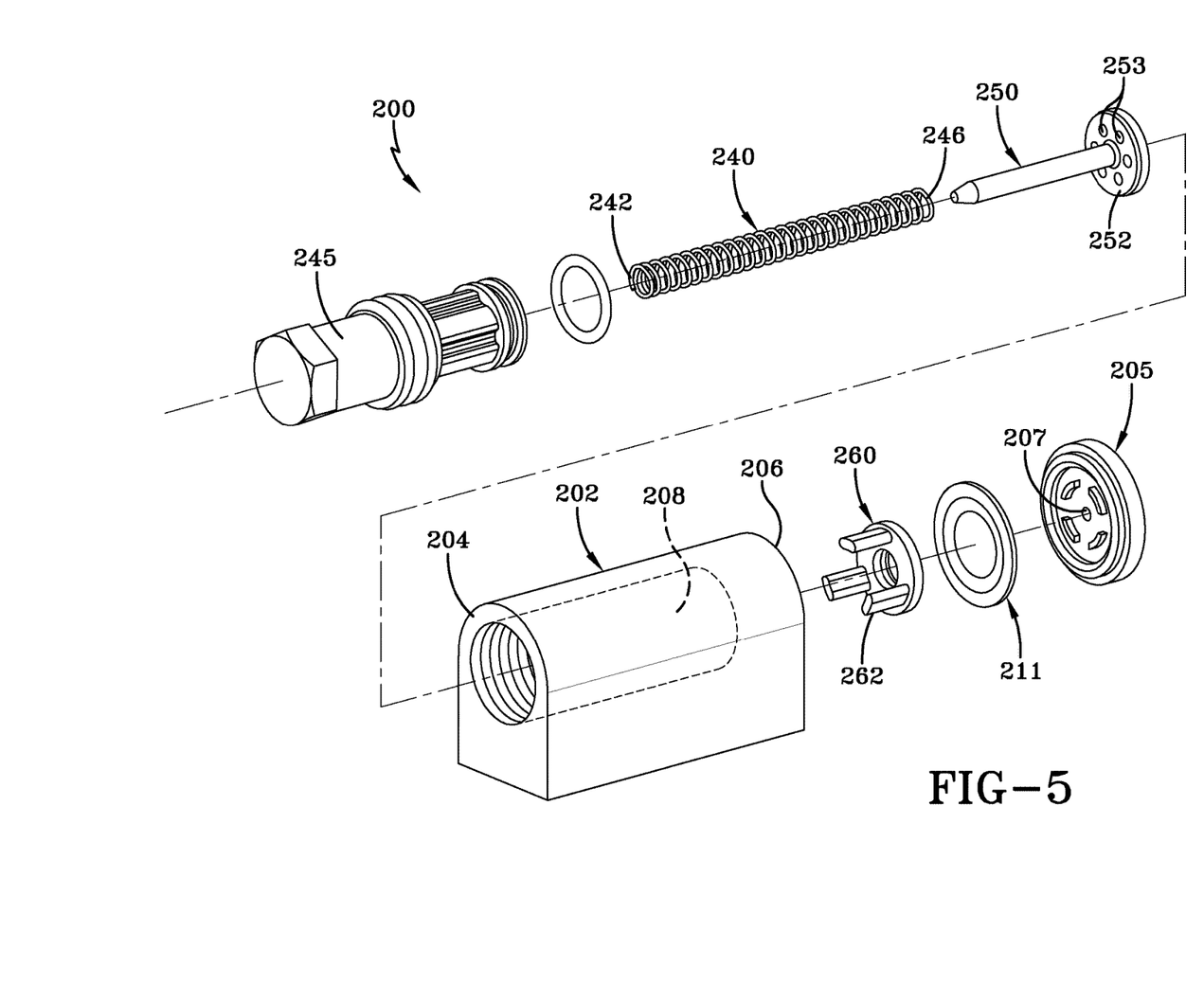
FIG. 5 is an exploded cross-sectional view of a first embodiment of a pressure regulator.
Figure 6:
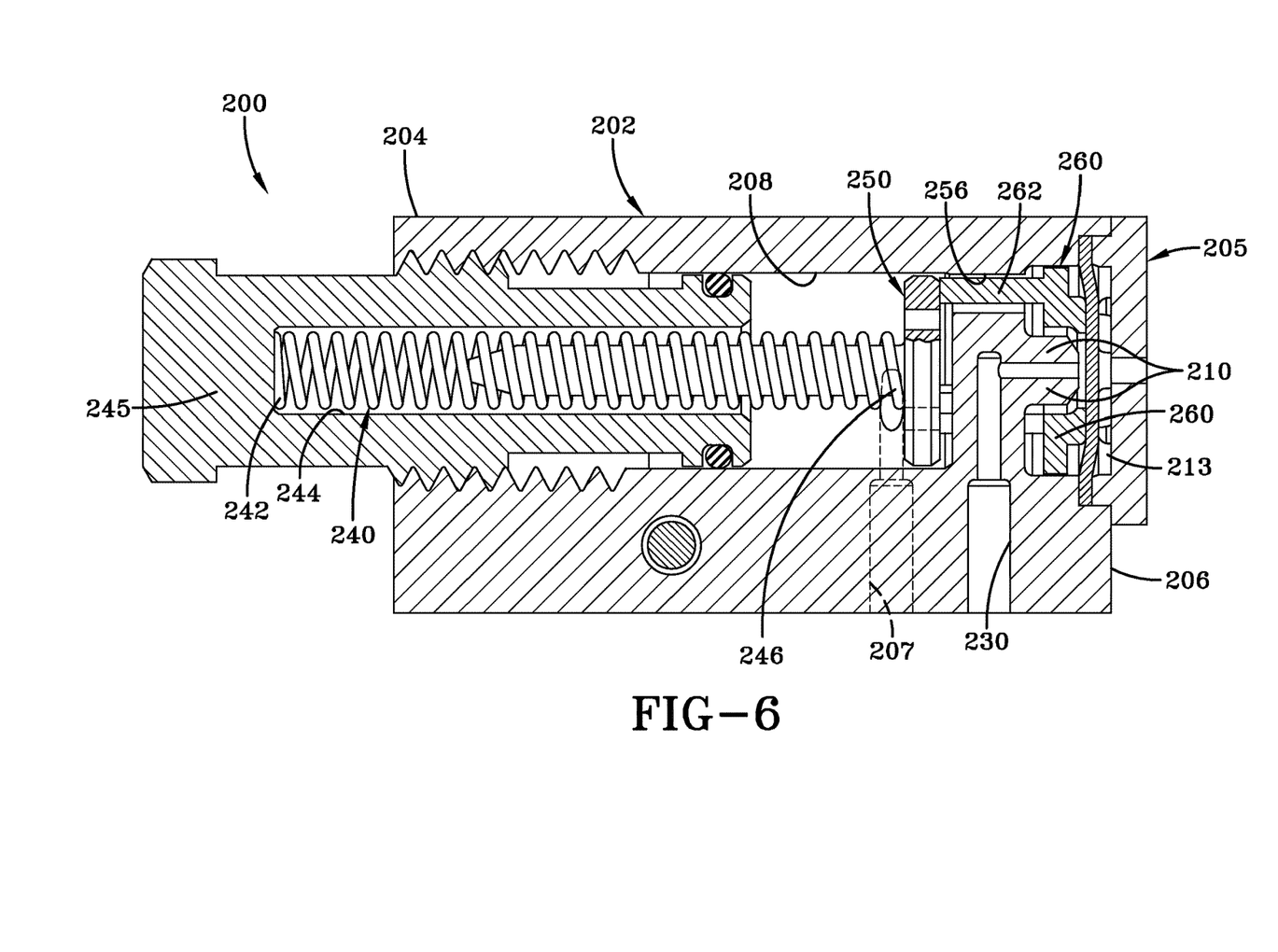
FIG. 6 is a cross-sectional view of the pressure regulator of FIG. 5 showing the adjustability feature.

A flexible diaphragm 211 has an outer side that is positioned adjacent the cap. The cap is secured to the second end of the housing. The cap 205, housing 202 and diaphragm 211 cooperate to form a pressure chamber 213 in pressure communication with the tire cavity via the hole in cap. The diaphragm seals the valve seat 210 when the tire cavity pressure is sufficient, preventing flow from entering fluid outlet passageway 230.

The diaphragm is biased into an open position by a spring 240. The spring has a first end 242 mounted in a channel 244 of a spring housing 245. The spring housing 245 is adjustably mounted within the first end 204 of the housing 202. The spring has a second end 246 that is wrapped about an actuator 250. The actuator 250 is a T shaped component mounted in the central bore 208. The upper portion 252 has a plurality of holes 254 through channel 256. Channel 256 communicates fluid from central bore 208 to outlet passageway 230 when the diaphragm is in the open position. Spring 240 exerts force on actuator 250, which biases actuator 250 in a direction away from the spring. The actuator cap 252 engages the legs 262 of diaphragm actuator 260, biasing the diaphragm into the open position. In operation, when the desired preset pressure is reached, the air pressure (from the tire cavity) acting on the diaphragm overcomes the preload force applied by the spring. The diaphragm closes off flow to outlet passageway 230, preventing flow into the pump.

In order to provide temperature compensated pressure regulation, the design of the valve device is as follows. The material of the housing 202 and spring housing 245 is selected from a material to have a high coefficient of expansion, in the range of 150 to 300×10−6 m/m K, more preferably in the range of 175 to 250×10−6 m/m K. One example of a material suitable for use is polyethylene with a coefficient of thermal expansion of 200×10−6 m/m K.

It is additionally preferred that the material of the outer cap 205 and valve seat be made of a low coefficient of thermal expansion in the range of about 75 to 150×10−6 m/m K, more preferably in the range of about 100 to about 125×10−6 m/m K.

The idea of the invention is to select two different materials, one with a high coefficient of thermal expansion and one with a low coefficient of thermal expansion in order to increase the gap distance d required for the valve to close. Temperature compensation of the pressure regulator is achieved by increasing the gap between the stop 250 and piston 242. The housing is selected to have a high coefficient of thermal expansion, while the piston regulator and adjustable member is selected to be made from materials having a low coefficient of thermal expansion. Thus the gap distance d between the valve seat and diaphragm increases due to expansion of the housing.

In a second embodiment of the invention, the spring 260 is formed from a shape memory alloy. The spring is made from a shape memory alloy, more preferably a nickel titanium spring selected to have an austenite-martensite transition in the range of temperatures 30 to 120 degrees F.

Figure 7:
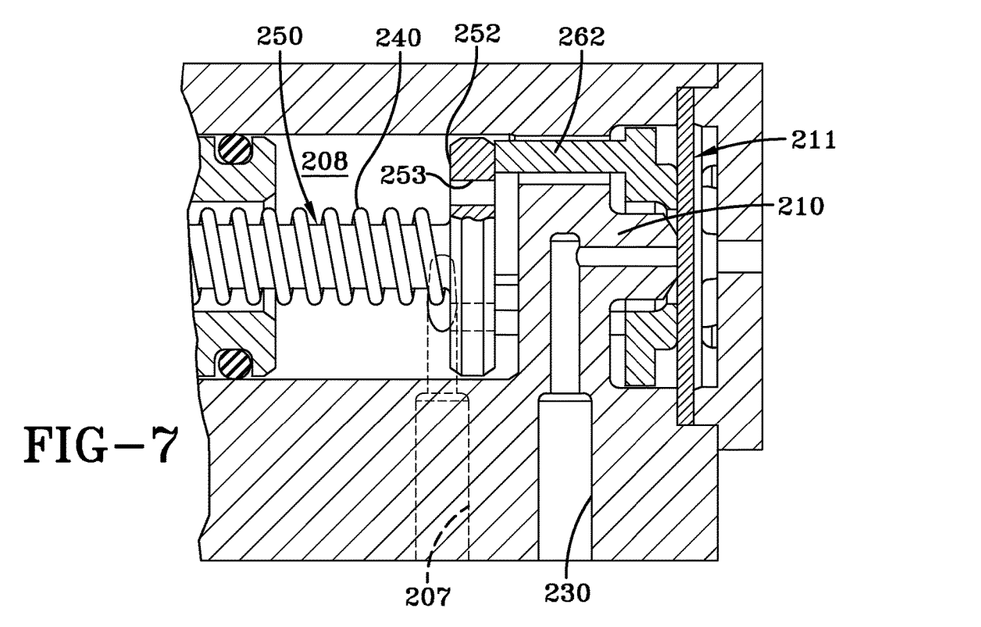
FIG. 7 is a cross-sectional view of the pressure regulator of FIG. 5 shown in operation in the closed position.
Figure 8:
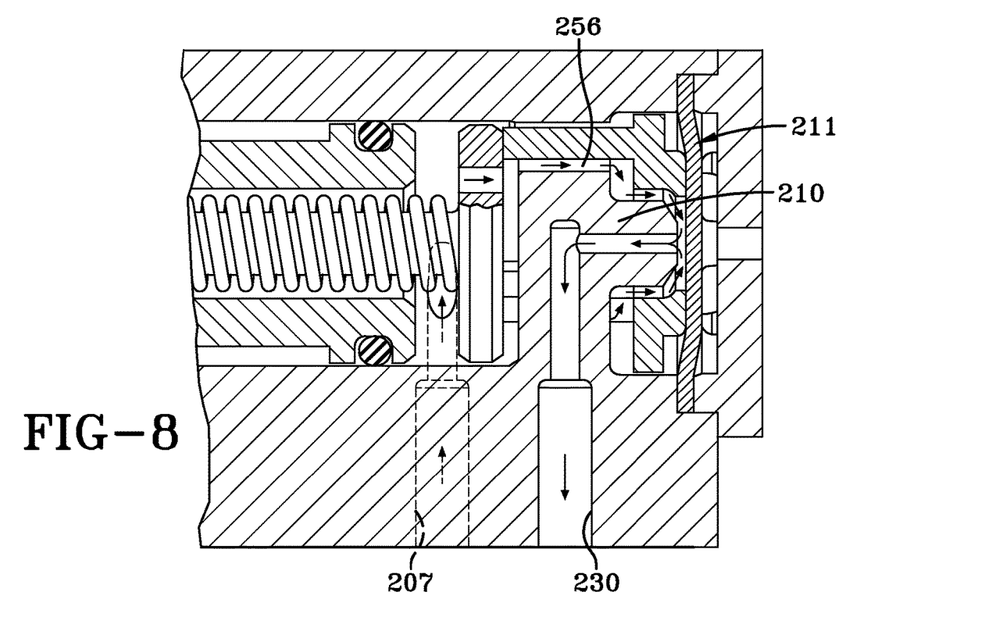
FIG. 8 is a cross-sectional view of the pressure regulator of FIG. 5 shown in operation in the open position.

The operation of the system may now be described. The diaphragm 211 is responsive to the pressure in the tire cavity, the pressure in the chamber 213 and the spring 240. When the tire pressure is sufficiently high, the diaphragm overcomes the spring force and is forced into engagement with the valve seat 210, thus sealing off flow to the inlet end of the pump, as shown in FIG. 7. As the tire pressure decreases, the spring force overcomes the force from the tire pressure, pushing the diaphragm away from the valve seat as shown in FIG. 8, allowing outside, filtered air to enter the central bore 208 via inlet passageway 207, through channel 256, into outlet passageway 230 and then into the inlet end of pump 41. The inlet regulator device 200 may be adjusted by screwing (rotating) the adjustable spring housing 245 in either direction in order to increase or decrease the spring pressure, thus altering the pressure at which flow will be shut off to the pump.

Figure 3:
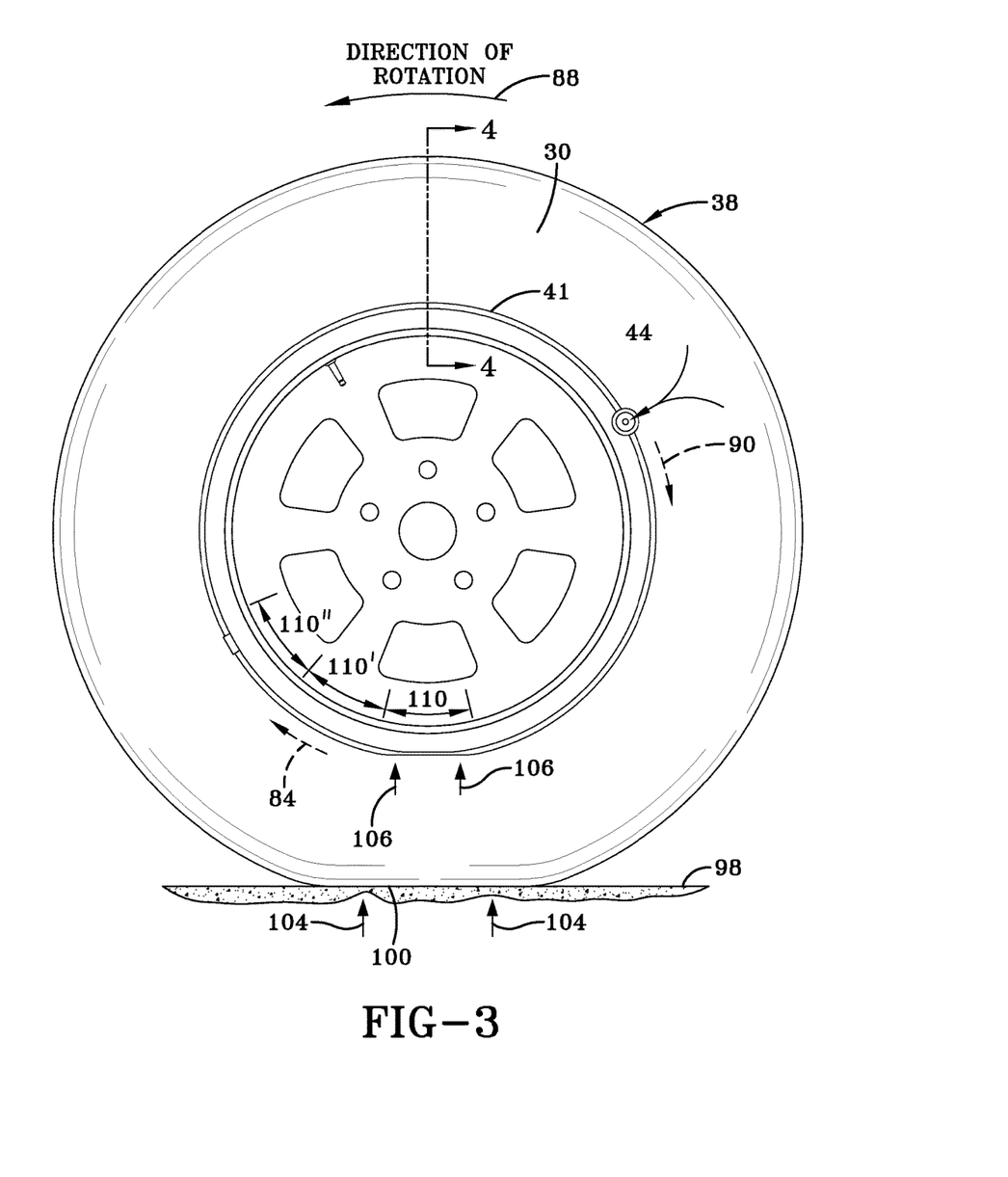
FIG. 3 illustrates the operation of the pump when the tire rotates.

As will be appreciated from FIG. 3, the inlet regulator device 200 is in fluid communication with the circular air pump 41 and positioned generally 360 degrees apart. As the tire rotates in a direction of rotation 88, a footprint 100 is formed against the ground surface 98. A compressive force 104 is directed into the tire from the footprint 100 and acts to flatten a segment 110 of the pump 41a as shown at numeral 106. Flattening of the segment 110 of the pump 41 forces a portion of air located between the flattened segment 110 and the outlet end 41b, in the direction shown by arrow 84 towards the pump outlet 41b.

As the tire continues to rotate in direction 88 along the ground surface 98, the pump tube 41 will be sequentially flattened or squeezed segment by segment in a direction 90 which is opposite to the direction of tire rotation 88. The sequential flattening of the pump tube 42 segment by segment causes the column of air located between the flattened segments to exit into the tire cavity.

With the tire rotating in direction 88, flattened tube segments are sequentially refilled by air 92 flowing into the inlet device 44 along the pump tube 42 in the direction 90 as shown by FIG. 3. The inflow of air from the inlet device 200 in direction 90 continues until the outlet device 46, rotating counterclockwise as shown with the tire rotation 88, passes the tire footprint 100.

As the temperature of the tire rises, the thermal expansion of the housing occurs at a higher rate than the cap, increasing the gap distance d between the valve seat. The major benefit of the invention is that the valve system is better able to control the set pressure of the tire, and not prematurely close (preventing inflation of the tire) due to the artificial temperature induced temperature increase.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a. a tire mounted to a rim, the tire having a tire cavity, first and second sidewalls extending respectively from first and second tire bead regions to a tire tread region;
   b. an air tube connected to the tire and defining an air passageway, the air tube being composed of a flexible material operative to allow a portion of the air tube segment near a tire footprint to substantially close the air passageway, and
   c. a valve device connected to an inlet end of the air tube, the valve device having a housing having first end and a second end, and a central bore which extends from the first end to a valve seat; said valve seat having an outlet passageway for communicating fluid from the central bore to the tire cavity; said housing having an inlet passage in fluid communication with the central bore and ambient air; a diaphragm mounted in the housing and having a first surface positioned to open and close the outlet passageway of the valve seat, and a second surface in fluid communication with the tire cavity; a cap connected to the housing and having a hole for fluid communication with the tire cavity, a spring mounted in the central bore and positioned to bias the diaphragm in the open position, wherein the housing is made from a material having a higher coefficient of thermal expansion than a material of the cap.

2. The self-inflating tire assembly of claim 1 wherein the housing is made from a material having a higher coefficient of thermal expansion than a material of the spring.

3. The self-inflating tire assembly of claim 1 wherein the housing is made from a material having a coefficient of thermal expansion in the range of 150 to 300×10-6 m/m K.

4. The self-inflating tire assembly of claim 1 wherein the spring is made from material having a spring force which varies with temperature.

5. The self-inflating tire assembly of claim 1 wherein the spring is made from a shape memory alloy having a variable spring constant.

\* \* \* \* \*